(12) United States Patent
Jung et al.

(10) Patent No.: US 10,750,529 B2
(45) Date of Patent: Aug. 18, 2020

(54) METHOD AND APPARATUS FOR COMMUNICATING OVER A LONG PHYSICAL UPLINK CHANNEL RESOURCE

(71) Applicant: Motorola Mobility LLC, Chicago, IL (US)

(72) Inventors: Hyejung Jung, Palatine, IL (US); Vijay Nangia, Woodridge, IL (US); Ravi Kuchibhotla, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/010,084

(22) Filed: Jun. 15, 2018

(65) Prior Publication Data

US 2018/0368168 A1    Dec. 20, 2018

Related U.S. Application Data

(60) Provisional application No. 62/521,279, filed on Jun. 16, 2017.

(51) Int. Cl.
| | |
|---|---|
| *H04W 72/12* | (2009.01) |
| *H04L 1/18* | (2006.01) |
| *H04W 72/04* | (2009.01) |
| *H04W 24/08* | (2009.01) |

(Continued)

(52) U.S. Cl.
CPC ....... *H04W 72/1289* (2013.01); *H04L 1/1812* (2013.01); *H04L 1/1861* (2013.01); *H04L 1/1864* (2013.01); *H04L 41/08* (2013.01); *H04W 24/08* (2013.01); *H04W 72/0413* (2013.01); *H04W 72/0453* (2013.01); *H04W 74/0833* (2013.01)

(58) Field of Classification Search
CPC ...................... H04W 72/1289; H04W 72/0453
See application file for complete search history.

(56) References Cited

U.S. PATENT DOCUMENTS

| | | |
|---|---|---|
| 8,553,671 B2 | 10/2013 | Kim |
| 9,247,534 B2 | 1/2016 | Han |
| 9,401,793 B2 | 7/2016 | Tang |

(Continued)

OTHER PUBLICATIONS

Tazelaar, Communication Relating to the Results of the Partial International Search, Form PCT/ISA/206, International Application No. PCT/US2018/037937, European Paatent Office, Rijswijkm, NL, dated Sep. 21, 2018.

(Continued)

*Primary Examiner* — Redentor Pasia
(74) *Attorney, Agent, or Firm* — Loppnow & Chapa; Matthew C. Loppnow

(57) ABSTRACT

A semi-static configuration information for a short physical uplink channel resource corresponding to a short physical uplink channel can be received at a device. Scheduling information to transmit over a long physical uplink channel resource corresponding to a long physical uplink channel can be received. The long physical uplink channel resource and the short physical uplink channel resource can at least partially overlap in time. The long physical uplink channel can be longer in duration than the short physical uplink channel. The long physical uplink channel resource can be transmitted over if the device does not support an uplink transmission on one or more non-contiguous physical resource blocks in the frequency domain.

18 Claims, 11 Drawing Sheets

(51) Int. Cl.
*H04L 12/24* (2006.01)
*H04W 74/08* (2009.01)

(56) References Cited

U.S. PATENT DOCUMENTS

| | | |
|---|---|---|
| 2012/0320848 A1 | 12/2012 | Chen |
| 2014/0003375 A1 | 1/2014 | Nam et al. |
| 2014/0003452 A1 | 1/2014 | Han |
| 2014/0169316 A1 | 6/2014 | Kim et al. |
| 2014/0233419 A1 | 8/2014 | Cheng |
| 2017/0202021 A1* | 7/2017 | Lee ................. H04L 25/0226 |
| 2017/0367046 A1 | 12/2017 | Papasakellariou |
| 2018/0097609 A1* | 4/2018 | Tiirola ................ H04L 5/0055 |
| 2018/0110042 A1* | 4/2018 | Chen .................. H04L 5/0055 |
| 2018/0124815 A1 | 5/2018 | Papasakellariou |
| 2018/0167933 A1* | 6/2018 | Yin .................. H04W 28/0231 |
| 2018/0167965 A1* | 6/2018 | Wang ................ H04L 1/0006 |
| 2018/0176909 A1* | 6/2018 | Wikstrom ......... H04W 72/0446 |
| 2018/0192416 A1* | 7/2018 | Yin .................. H04W 72/0413 |
| 2018/0270011 A1 | 9/2018 | Yang |
| 2018/0278454 A1* | 9/2018 | Islam ................. H04L 1/0038 |
| 2018/0279326 A1 | 9/2018 | Park et al. |
| 2018/0310257 A1 | 10/2018 | Papasakellariou |
| 2018/0316464 A1 | 11/2018 | Stern-Berkowitz |
| 2018/0343085 A1 | 11/2018 | Tirucherai Muralidharan et al. |
| 2019/0007867 A1 | 1/2019 | Hu et al. |
| 2019/0068317 A1 | 2/2019 | Babaei |
| 2019/0075590 A1 | 3/2019 | Andersson et al. |
| 2019/0132837 A1* | 5/2019 | Yi ........................ H04L 5/00 |
| 2019/0191453 A1 | 6/2019 | Xiong et al. |
| 2019/0200347 A1* | 6/2019 | Ryu ................. H04W 72/0413 |
| 2019/0281622 A1 | 9/2019 | Hwang et al. |

OTHER PUBLICATIONS

Papantoniou, PCT International Search Report, International Application No. PCT/US2018/037937, European Patent Office, Rijswijk, NL, dated Nov. 21, 2018.

Nokia, On the multiplexing between PUCCHs and PUSCH, R1-1708518, 3GPP TSG RAN WG1#89, Hangzhou, P.R. China, May 15-19, 2017.

LG Electronics, Consideration on NR-PUCCH resource allocation, R1-1707644, 3GPP TSG RAN WG1 Meeting 189, Hangzhou, P.R. China, May 15-19, 2017.

Perez, Notice of References Cited, U.S. Appl. No. 16/010,153, U.S. Patent and Trademark Office, dated Jul. 23, 2019.

LG Electronics (Consideration on NR-PUCCH resource allocation, R1-1707644), May 15-19, 2017 3GPP TSG RAN WG1 Meeting #89, whole document (Year: 2017).

Cattungal, Notice of References Cited, U.S. Appl. No. 16/010,010, U.S. Patent and Trademark Office, dated Oct. 4, 2019.

Perez, Notice of References Cited, U.S. Appl. No. 16/010,153, U.S. Patent and Trademark Office, dated Jan. 24, 2020.

Babaei, UCI Multiplexing, Aug. 10, 2017, U.S. Appl. No. 62/543,859 (provisional of US 2019/0068317 A1), whole document (Year: 2017).

Cattungal, Notice of References Cited, U.S. Appl. No. 16/010,010, U.S. Patent and Trademark Office, dated Apr. 2, 2020.

* cited by examiner

*1200*

1210 RECEIVING, AT A DEVICE, SCHEDULING INFORMATION TO TRANSMIT A PHYSICAL UL CHANNEL, THE SCHEDULING INFORMATION INCLUDING MODIFICATION INFORMATION REGARDING MODIFYING A PHYSICAL UL CHANNEL TRANSMISSION

1220 TRANSMITTING THE PHYSICAL UL CHANNEL BASED ON THE SCHEDULING INFORMATION INCLUDING THE MODIFICATION INFORMATION

FIG. 12

*1300*

1310 DETERMINING, BY A DEVICE, SCHEDULING INFORMATION TO TRANSMIT A PHYSICAL UL CHANNEL, THE SCHEDULING INFORMATION INCLUDING MODIFICATION INFORMATION REGARDING MODIFYING A PHYSICAL UL CHANNEL TRANSMISSION

1320 TRANSMITTING THE SCHEDULING INFORMATION INCLUDING THE MODIFICATION INFORMATION

1330 RECEIVING THE PHYSICAL UL CHANNEL BASED ON THE SCHEDULING INFORMATION INCLUDING THE MODIFICATION INFORMATION

FIG. 13

METHOD AND APPARATUS FOR COMMUNICATING OVER A LONG PHYSICAL UPLINK CHANNEL RESOURCE

BACKGROUND

1. Field

The present disclosure is directed to a method and apparatus for communicating on a wireless network. More particularly, the present disclosure is directed to communicating using a physical uplink channel on a wireless wide area network.

2. Introduction

Presently, wireless communication devices, such as User Equipments (UEs), communicate with other communication devices using wireless signals. A Physical Uplink Control Channel (PUCCH) carries Uplink Control Information (UCI) such as Hybrid Automatic Repeat Request-Acknowledgement (HARQ-ACK) feedback, Scheduling Requests (SR), and Channel State Information (CSI). In Fifth Generation (5G) Radio Access Technology (RAT), such as 3rd Generation Partnership Project (3GPP) New Radio (NR) RAT, two types of PUCCH formats in terms of transmission duration, short PUCCH and long PUCCH, can be defined to support various services requirements. Short PUCCH with 1 or 2 Orthogonal Frequency Division Multiplexing (OFDM) or Discrete Fourier Transform-spread-OFDM (DFT-s-OFDM) symbol duration is suitable for support of low-latency traffic with fast HARQ-ACK feedback. Long PUCCH has 4-14 OFDM or DFT-S-OFDM symbols of a slot, where a slot can be defined as a time unit that has one or more symbols. The long PUCCH also may span over multiple slots that can be used for coverage extension and/or large payload UCI transmission.

During contention-based 4-step random access procedure, a Message 4 (Msg4) is transmitted by a Network Entity (NE), such as a gNodeB (gNB), for contention resolution, and it may be addressed by either a Cell Radio Network Temporary Identifier (C-RNTI) that is included in Msg 3 from a UE, such as for the case of connected mode UEs, or a temporary C-RNTI that is included in a Random Access Response (RAR) message, such as Msg2, from the NE. The UE transmits Acknowledgement (ACK) if the UE correctly decodes Msg4 and detects its own identity. If the UE fails to decode Msg4, misses a Downlink (DL) grant, or correctly decodes Msg4 but discovers another UE's identity in the decoded Msg4, the UE does not send anything, which is known as Discontinuous Transmission (DTX). Since a valid dedicated PUCCH resource has not yet been configured for the UE during the contention-based random access procedure due to initial access or due to Uplink (UL) timer expiration and release/reset of previously configured PUCCH resources, a method to determine a PUCCH resource for HARQ-ACK feedback in response to Msg4 needs to be developed.

To support Ultra-Low Latency (ULL) services with close-to-zero scheduling delay, a UE may need to be configured with multiple short PUCCH-based ULL SR resources within a slot. Further, with mini-slot based scheduling, a short PUCCH or a short Physical Uplink Shared Channel (PUSCH) may occur on any symbol within a slot, instead of on the last few symbols of the slot. When the UE has to concurrently serve two different types of traffic, such as normal latency traffic and ULL traffic, it is useful to define rules to multiplex slot-based long PUSCH and/or PUCCH, such as physical uplink channels, for normal latency traffic with mini-slot based short PUCCH/PUSCH for ULL traffics.

As for HARQ-ACK feedback in response to Msg4, it has been proposed that a UE determines a PUCCH resource in an implicit or explicit manner, such as indicated by DL scheduling Downlink Control Information (DCI), from a set of group-common or common PUCCH resources configured via a RAR or a System Information Block (SIB). Because of potential retransmission of Msg3, delay for successful Msg3 transmission and reception may be different for different UEs using the same Random Access Channel (RACH) time/frequency resource, and delay distribution may change over time. Thus, there may be the case that NE cannot confine a UEs' HARQ-ACK feedback transmissions in response to Msg4 within a predefined set of PUCCH resources, such as when all UEs transmitting RACH preambles in the same RACH radio resource have similar or same delay for successful Msg3 transmissions, unless the PUCCH resource set is over-provisioned. The over-provisioned common PUCCH resource set would potentially degrade spectral efficiency.

It has also been proposed to multiplex long PUCCH with short PUCCH in Code Division Multiplexing (CDM) manner when they are transmitted from one UE in the same slot and when long PUCCH uses a PUCCH format with orthogonal code-based multi-user multiplexing. When a UE can use long PUCCH and short PUCCH as per channel conditions, such as path loss, long PUCCH is typically used for large payload UCI transmission. Since the PUCCH format with orthogonal code based multi-user multiplexing is mainly for small payload UCI transmission, CDM of long PUCCH with short PUCCH from the same UE may not be a relevant use case.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

FIG. 12 is an example flowchart illustrating the operation of a wireless communication device according to a possible embodiment;

FIG. 13 is an example flowchart illustrating the operation of a wireless communication device according to a possible embodiment.

DETAILED DESCRIPTION

Figure 1:
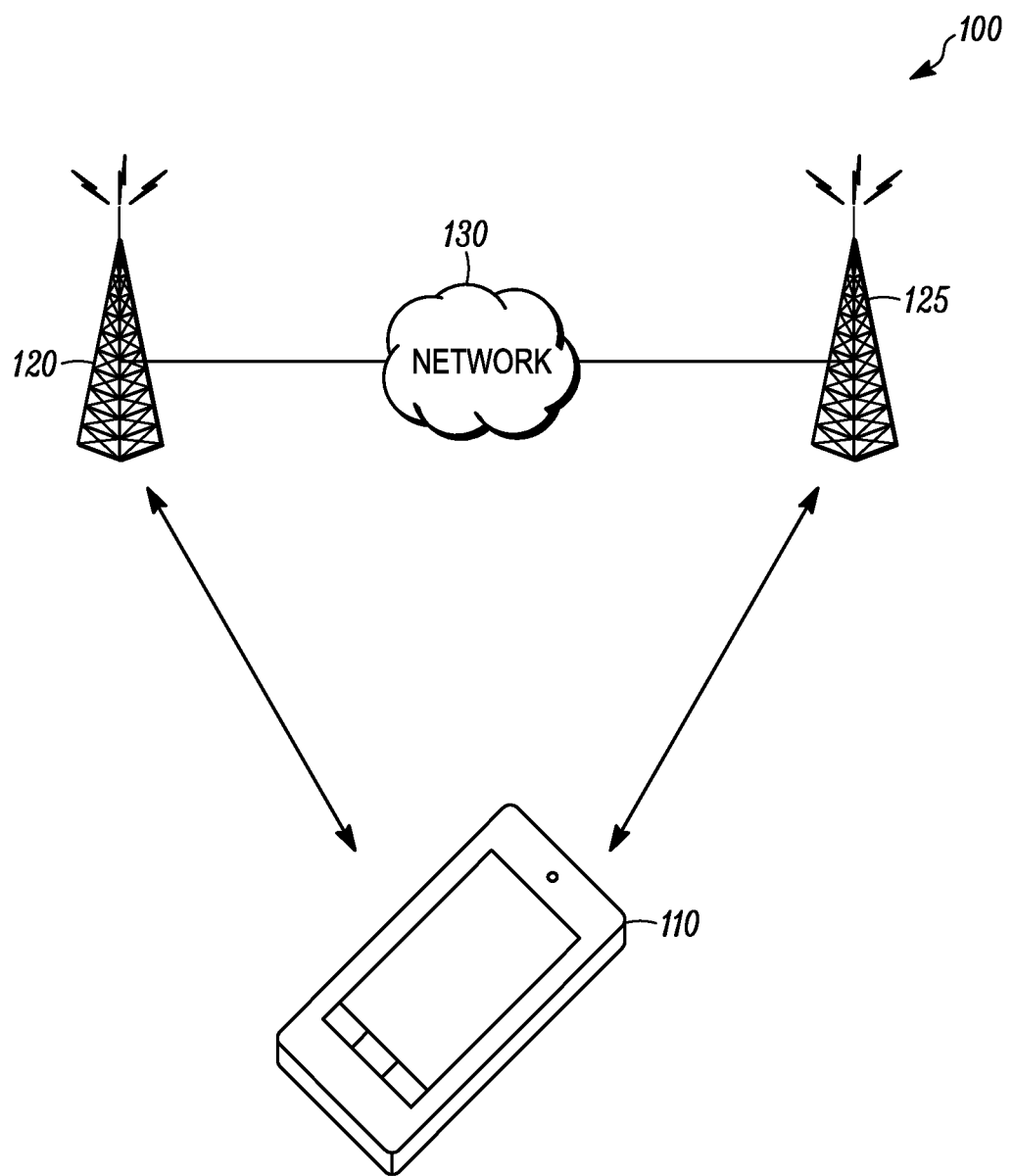
FIG. 1 is an example block diagram of a system according to a possible embodiment.

Some embodiments provide a method and apparatus for communicating on a wireless network. Some embodiments can further provide a method and apparatus for transmitting and/or receiving a HARQ-ACK feedback on an UL control channel Some embodiments can additionally provide a method and apparatus for transmitting and/or receiving over a long physical UL channel resource. Some embodiments can also provide a method and apparatus for transmitting and/or receiving a physical UL channel based on modification information.

According to a possible embodiment, a lack of a valid dedicated UL control channel resource configuration can be ascertained by a device. A number of symbols for an UL control channel can be determined in response to ascertaining a lack of a valid dedicated UL control channel resource configuration. A DL message can be received. The DL message can be based on a device identity of the device. A HARQ-ACK feedback can be transmitted on the UL control channel using the determined number of symbols in response to receiving the DL message.

According to another possible embodiment, a number of symbols for an UL control channel can be determined by a device. System information indicating the number of symbols for the UL control channel can be transmitted. A DL message based on a device identity can be transmitted. HARQ-ACK feedback can be received on the UL control channel using the indicated number of symbols in response to transmitting the DL message.

According to another possible embodiment, a semi-static configuration information for a short physical UL channel resource corresponding to a short physical UL channel can be received at a device. Scheduling information to transmit over a long physical UL channel resource corresponding to a long physical UL channel can be received. The long physical UL channel resource and the short physical UL channel resource can at least partially overlap in time. The long physical UL channel can be longer in duration than the short physical UL channel. The long physical UL channel resource can be transmitted over if the device does not support an UL transmission on one or more non-contiguous PRBs in the frequency domain.

According to another possible embodiment, semi-static configuration information for a short physical UL channel resource corresponding to a short physical UL channel can be ascertained by a device. The semi-static configuration information for the short physical UL channel resource can be transmitted. Scheduling information to transmit over a long physical UL channel resource corresponding to a long physical UL channel can be determined. The long physical UL channel and the short physical UL channel resource can at least partially overlap in time. The long physical UL channel can be longer in duration than the short physical UL channel. The determined scheduling information can be transmitted. Information can be received on the long physical UL channel resource.

According to another possible embodiment, scheduling information to transmit a physical UL channel can be received at a device. The scheduling information can include modification information regarding modifying a physical UL channel transmission. The physical UL channel can be transmitted based on the scheduling information including the modification information.

According to another possible embodiment, scheduling information to transmit a physical UL channel can be determined by a device. The scheduling information can include modification information regarding modifying a physical UL channel transmission. The scheduling information including the modification information can be transmitted. The physical UL channel based on the scheduling information including the modification information can be received.

FIG. 1 is an example block diagram of a system 100 according to a possible embodiment. The system 100 can include a User Equipment (UE) 110, at least one Network Entity (NE) 120 and 125, such as a base station, and a network 130. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The at least one NE 120 and 125 can be wireless wide area network base stations, can be NodeBs, can be enhanced NodeBs (eNBs), can be New Radio (NR) NodeBs (gNBs), such as 5G NodeBs, can be unlicensed network base stations, can be access points, can be base station controllers, can be network controllers, can be Transmission/Reception Points (TRPs), can be different types of base stations from each other, and/or can be any other network entities that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3GPP-based network, a satellite communications network, a high altitude platform network, the Internet, and/or other communications networks.

In operation, the UE 110 can communicate with the network 130 via at least one network entity 120. For example, the UE can send and receive control signals on a control channel and user data signals on a data channel.

Some embodiments can provide resource allocation and multiplexing for flexible uplink communications. Some embodiments can additionally provide a HARQ-ACK resource for Msg4 during RACH procedure. Some embodiments can also provide methods to determine a PUCCH resource for HARQ-ACK feedback in response to Msg4. Some embodiments can further provide methods to multiplex slot-based long PUSCH/PUCCH with mini-slot based short PUCCH/PUSCH.

According to a possible embodiment, a UE can always employ a long PUCCH for HARQ-ACK feedback to Msg4 to avoid potential PUCCH coverage limitation and UE capability issues. During initial access, it may be difficult for a NE to estimate UL path loss, a UE's power headroom, or UE capability to support low latency traffic with short PUCCH/PUSCH. Thus, the long PUCCH with longer transmission duration may guarantee reliable UCI decoding and serve all types of UEs. In one example, the long PUCCH for HARQ-ACK feedback to Msg4 may consist of or include a pre-determined number of OFDM or DFT-s-OFDM symbols based on the reference numerology of a given frequency band. Pre-determined long PUCCH duration can be easily accommodated in Frequency Division Duplexing (FDD) systems, as the number of available UL symbols does not change over slots. In another example, a NE can indicate, as a part of system information, the number of symbols for the long PUCCH carrying HARQ-ACK feedback for Msg4, which may depend on a cell size and/or the number of semi-statically configured symbols for a downlink control region for particularly a TDD system. Alternatively, the NE can implicitly or explicitly indicate the number of symbols for the long PUCCH carrying HARQ-ACK feedback for Msg4 in the DCI that includes DL scheduling information for Msg4. One example of implicit indication is that the NE can indicate a starting and/or ending symbol(s) of the long PUCCH. Further, the duration of long PUCCH, such as single-slot or multi-slot long PUCCH, can be determined according to the total number of PUSCH transmissions required for successful Msg3 decoding. Additionally, or alternatively, the duration of long PUCCH can be determined according to the available UL symbols in a slot where HARQ-ACK feedback to Msg4 will be transmitted. In another example, the duration of long PUCCH may be determined based on the Modulation and Coding Scheme (MCS) of the Msg3 PUSCH transmission. The duration of long PUCCH may be based on one or more of the above schemes. In one example, the duration of long PUCCH may be a separately encoded field of the DCI or may be jointly encoded with other msg4 DCI information in the DCI.

In one example, a UE that knows its UE identity, such as Cell Radio Network Temporary Identifier (C-RNTI) is unknown to the NE, such as when the UE is not in a Radio Resource Control (RRC)-connected state, can use long PUCCH for HARQ-ACK feedback to Msg4. If a UE knows its UE identity, such as C-RNTI, is known to the NE, such as when the UE is in an RRC-connected state, the UE can use long PUCCH or short PUCCH for msg 4 HARQ-ACK feedback based on one or more of short PUCCH UE capability, a PUCCH type and/or duration configuration signaling, a short PUCCH if path loss less than a threshold, a number of PUSCH transmissions required for successful Msg3 decoding, MCS allocated to Msg 3, and/or other criteria described in this disclosure.

According to another possible embodiment, a NE may determine and indicate a PUCCH type in terms of time duration, such as short or long, for UE's HARQ-ACK feedback to Msg4, based on preamble received power, the total number of PUSCH transmissions required for successful Msg3 decoding, and/or an implicit indication from the UE. Alternatively, both the NE and the UE may identify the PUCCH duration type for HARQ-ACK feedback to Msg4 based on the total number of Msg3 transmissions. The UE may interpret some of DCI bit fields in a PDCCH that delivers scheduling information for Msg4 and the UE's HARQ-ACK feedback to Msg4 differently depending on the identified PUCCH duration type. If the UE is capable of supporting a short PUCCH, the UE can indicate in Msg3 whether to support short PUCCH or not, such as via a 1-bit flag. In one example, if only one Msg3 transmission occurs before Msg4 reception, the UE can use a short PUCCH for HARQ-ACK feedback to Msg4.

Otherwise, the UE can use a long PUCCH for HARQ-ACK feedback to Msg4. In another example, the NE can partition a set of preambles into two or more subsets and the UE can select a preamble subset depending on a DL path loss estimate. DL path loss threshold value(s) for each preamble subset can be predefined or can be signaled as a part of RACH configuration information. If the NE detects a preamble from the preamble subset corresponding to DL path loss larger than a certain value and/or schedules one or more retransmission(s) of Msg3, the NE can inform the UE to use a long PUCCH via DCI that includes DL scheduling information for Msg4. Further, the NE can transmit a dynamic indication on the number of symbols for the long PUCCH.

Considering that HARQ-ACK feedback to Msg4 is either ACK or DTX, similar to SR on/off signaling, one sequence can be allocated for Msg4 HARQ-ACK feedback to indicate ACK or DTX. Furthermore, a HARQ-ACK PUCCH in response to Msg4 can be code-division multiplexed (CDM'ed) with sequence-based SR PUCCHs from other UEs or sequence-based HARQ-ACK PUCCHs from other UEs.

In order to avoid radio resource waste or PUCCH resource blocking from pre-configured common PUCCH resources, DL scheduling DCI for Msg4 can include information on allocated Physical Resource Blocks (PRBs) and allocated sequences, such as cyclic shifts of a base sequence, for HARQ-ACK transmission with limited signaling overhead. In one example, for long PUCCH, an allocated PRB index, where PRB indexing starts from a bandwidth part boundary, can be determined based on a dynamically signaled value together with a semi-statically indicated, such as via RAR or SIB, PRB offset. In another example, for short PUCCH, DCI can indicate a sub-band group index and allocated PRB(s) within the assigned sub-band group, where the sub-band group includes one or more contiguous or non-contiguous sub-bands and a sub-band includes one or more consecutive PRBs. The aforementioned methods for UE's HARQ-ACK feedback to Msg4 are also applicable to PUCCH resource determination for UE's HARQ-ACK transmission when UE does not have dedicated PUCCH resource configuration.

Figure 2:
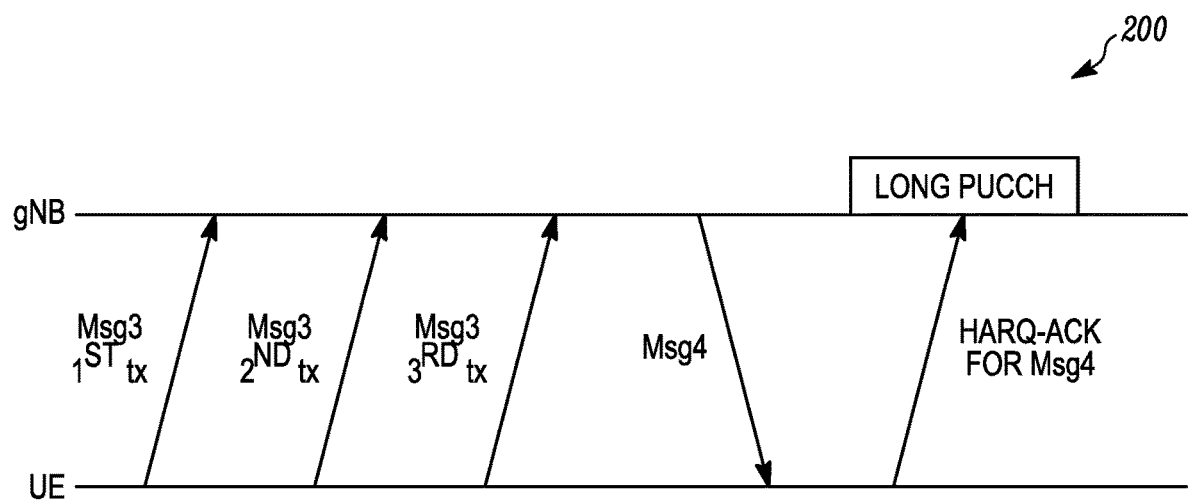
FIG. 2 is an example illustration of long PUCCH type selection for HARQ-ACK feedback to Msg4 based on the number of Msg3 transmissions according to a possible embodiment.
Figure 3:
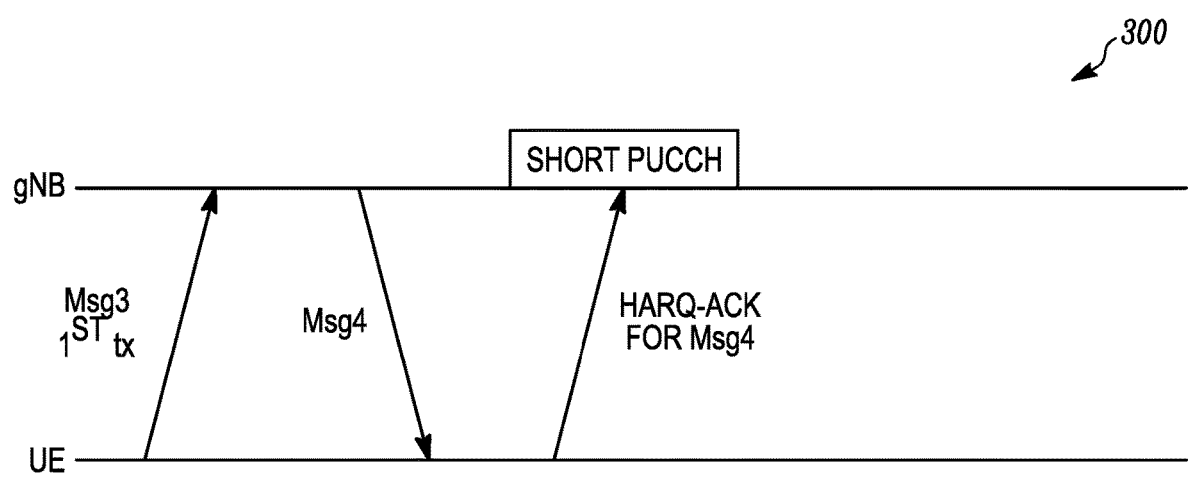
FIG. 3 is an example illustration of short PUCCH type selection for HARQ-ACK feedback to Msg4 based on the number of Msg3 transmissions according to a possible embodiment.

FIG. 2 is an example illustration 200 of long PUCCH type selection for HARQ-ACK feedback to Msg4 based on the number of Msg3 transmissions according to a possible embodiment. FIG. 3 is an example illustration 300 of short PUCCH type selection for HARQ-ACK feedback to Msg4 based on the number of Msg3 transmissions according to a possible embodiment. After a UE's RRC connection establishment, a NE can determine or switch a PUCCH type between long PUCCH and short PUCCH for the UE's subsequent UCI transmission based on at least the UE's Power Headroom Report (PHR) and/or the average number of UL transmissions for successful decoding of one UL Transport Block (TB) during a certain period. If the UE has power headroom smaller than a certain threshold, the NE can indicate the UE to use long PUCCH in order to overcome a potential UL transmit power limitation. A high number of retransmissions may occur if the interference level changes dynamically and accordingly, the initial selection of MCS may not be optimal. In this case, overprovisioning PUCCH resources by using long PUCCH may be useful to avoid potential PUCCH decoding error due to dynamic interference variation.

According to a possible implementation, slot-based long PUSCH/PUCCH and mini-slot based short PUSCH/PUCCH can coexist. UEs that are not limited by uplink Transmit (Tx) power or have sufficient power headroom, such as above a certain threshold, may be able to use both long PUCCH and short PUCCH depending on UCI types, traffic types, and/or applications. For example, a UE may be semi-statically configured with a long PUCCH resource for periodic transmission of large payload UCI, such as a periodic CSI report including narrow beam related information, while a short PUCCH resource can be used for SR or HARQ-ACK transmission. In another example, mini-slot based short PUSCH/PUCCH can be used for Ultra-Reliable Ultra-Low-Latency (URLLC) traffic, and slot-based long PUSCH/PUCCH can be employed for normal traffic, such as regular latency traffic.

When multiplexing slot-based and mini-slot based uplink transmissions within a UE, potential issues on inter-modulation and Power Amplifier (PA) output power back-off can be taken into account. For example, simultaneous transmission of long PUSCH/PUCCH and short PUSCH/PUCCH from one UE with non-continuous PRB allocation in the frequency domain may cause significant signal distortion and/or in-band/out-of-band emissions. Furthermore, when multiplexing long PUSCH/PUCCH and short PUSCH/PUCCH from different UEs or from the same UE, different scheduling frequencies, such as mini-slot vs slot level scheduling and semi-static vs dynamic scheduling, different HARQ processing timelines, and different processing delays for UL transmission upon reception of UL grant can be considered to determine UE behaviors.

According to a possible embodiment, a UE may operate according to the following options to multiplex semi-statically configured short PUCCH/PUSCH, such as for URLLC SR and grant-free UL data transmission, and dynamically scheduled long PUSCH/PUCCH, such as for grant-based UL data transmission and aperiodic CSI report.

According to a possible option for UE operation, semi-static URLLC SR or grant-free PUSCH resources may be UE-specifically or cell-specifically configured. Even with UE-specific configuration, the time-frequency resources may still be shared by multiple UEs, such as via CDM.

Figure 4:
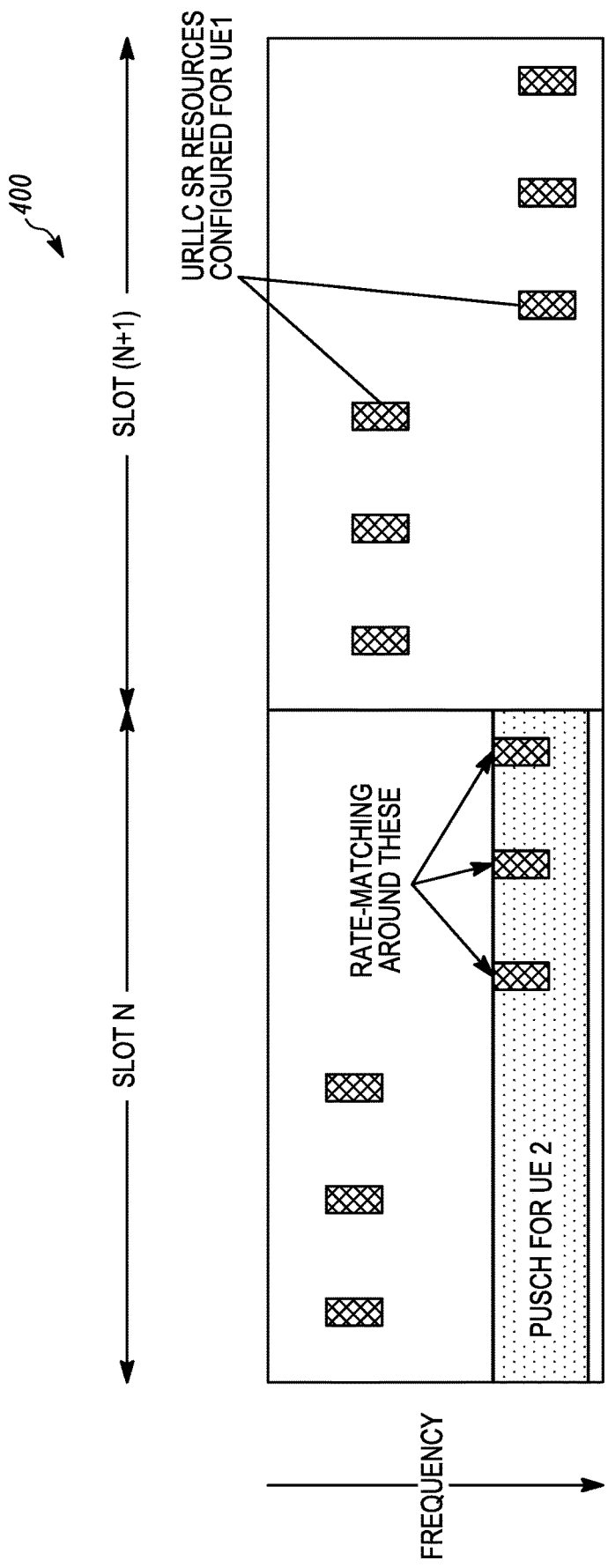
FIG. 4 is an example illustration of multiplexing semi-statically configured short PUCCH with slot-based PUSCH from different UEs according to a possible embodiment.

FIG. 4 is an example illustration 400 of multiplexing semi-statically configured short PUCCH with slot-based PUSCH from different UEs according to a possible embodiment. According to this option for UE operation for multiplexing different UEs, UL DCI scheduling of long PUSCH/PUCCH can include an indication of the semi-statically configured short PUSCH/PUCCH resource for other UEs, such as UE 2, that fully or partially overlaps with the long PUSCH/PUCCH resource in time and in frequency, such as for UE 1, as shown in the illustration 400. The UE, such as UE 1, can determine the overlapped Resource Elements (REs) based on the indication and can perform rate-matching around the overlapped REs for the long PUSCH/PUCCH. If the semi-static short PUSCH/PUCCH resource is selected from a predefined set of resources, and/or the short PUSCH/PUCCH resource is determined by combination of one of predefined configuration and a few configurable parameters, a signaling overhead in UL DCI for indicating the semi-statically configured short PUCCH/PUSCH resource can be reduced by including a selected configuration index and a few configurable parameters.

Figure 5:
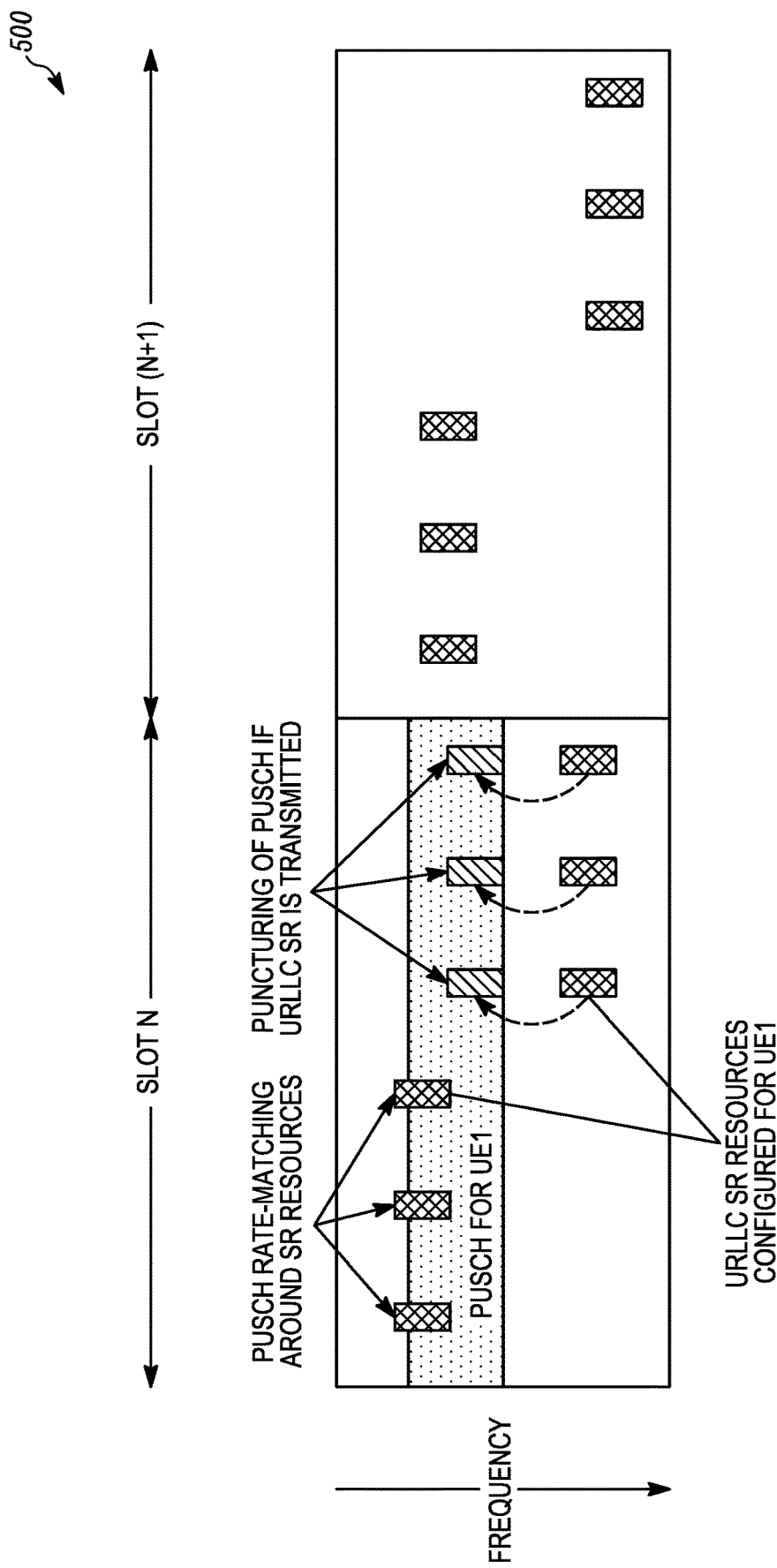
FIG. 5 is an example illustration of multiplexing semi-statically configured short PUCCH with slot-based PUSCH from one UE according to a possible embodiment.

FIG. 5 is an example illustration 500 of multiplexing semi-statically configured short PUCCH with slot-based PUSCH from one UE according to a possible embodiment. According to this option for UE operation for multiplexing within a single UE, if, in a given symbol, long PUCCH/PUSCH resource allocation includes or partially includes the semi-statically configured short PUCCH/PUSCH resources, the UE can consider the configured short PUCCH/PUSCH resources not available for long PUSCH/PUCCH and can perform rate-matching around the configured short PUCCH/PUSCH resources. Although the UE may not transmit URLLC SR or grant-free data transmission on the configured short PUCCH/PUSCH resources, other UEs may use the configured short PUCCH/PUSCH resources. Thus, the UE can perform rate-matching irrespective of whether it actually transmits short PUCCH/PUSCH on the configured resources. If, in a given symbol, long PUCCH/PUSCH resource allocation does not include the semi-statically configured short PUCCH/PUSCH resources and if the UE is not capable of simultaneous transmissions on non-contiguous PRBs for example, due to emission issues or UE capability, and the UE should transmit short PUCCH/PUSCH, the short PUCCH/PUSCH transmission can be moved into the allocated long PUCCH/PUSCH resource, as shown in the illustration 500. If the actual short PUCCH/PUSCH transmission from the UE may or may not occur, such as for URLLC SR or grant-free transmission, and whether to transmit short PUCCH/PUSCH or not is determined in a mini-slot or non-slot level, where a mini-slot is a transmission duration smaller than a slot, it may be difficult for UE to perform rate-matching around the moved short PUCCH/PUSCH resources in advance by taking into account the actual transmission. Thus, the UE may puncture the long PUSCH/PUCCH for the moved short PUCCH/PUSCH resources, if short PUCCH(s)/PUSCH(s) are actually transmitted. In one example where the long PUSCH/PUCCH has been prepared, such as by channel coding and rate-matching for the allocated long PUSCH/PUCCH resources, or is in the process of being prepared for transmission prior to the need to transmit a short PUCCH/PUSCH transmission, such as from a trigger for URLLC SR or grant-free transmission, so to avoid the re-processing and the associated processing delays and the need to reserve hardware time budget for packet generation and preparation of the long PUSCH/PUCCH, the short PUSCH/PUCCH transmission can puncture the long PUSCH/PUCCH REs. In one example, the short PUSCH/PUCCH transmission can puncture at least the overlapping long PUSCH/PUCCH symbols even if the short PUSCH/PUCCH partially overlaps on some of the REs of the long PUSCH/PUCCH. Puncturing more than the just the overlapping symbols can be done prior to and following the short PUSCH/PUCCH transmission to allow for power adjustment and setting settling time, as the targeted transmission power for the short PUSCH/PUCCH and long PUSCH/PUCCH may be different. In some examples, the long PUSCH/PUCCH can be dropped if the UE is unable or not capable of maintaining transmit phase continuity after the short PUSCH/PUCCH transmission, such as due to a power change, a resource change, and/or power ramp-up/down transients. In some examples, the long PUSCH/PUCCH may be resumed in the next mini-slot or slot in the case of mini-slot or slot aggregation allocating a plurality of mini-slots or slots with each mini-slot or slot having its own phase reference signals.

In another example, if the short PUSCH/PUCCH overlaps at least a portion of the reference signal symbols of the long PUSCH/PUCCH, the long PUSCH/PUCCH transmission can be dropped. In some examples with intra-slot hopping, the long PUSCH/PUCCH transmission can be dropped for the intra-slot hop dwell time. The long/PUSCH transmission may be resumed starting at the start of the second intra-slot hop dwell period if the long PUSCH/PUCCH transmission is dropped in the first hop dwell period. In another example, if the UE has knowledge or is aware that the short PUSCH/PUCCH transmission is going to overlap with an upcoming long PUSCH/PUCCH transmission, the UE can drop at least a significant portion if not all of the long PUSCH/PUCCH transmission. In an example with multiple reference signals for long PUSCH/PUCCH in a slot and where the UE is assigned to use an orthogonal cover code over the two or reference signals, in the case of collision between the short PUSCH/PUCCH with any portion of the reference signals with Orthogonal Cover Code (OCC), at least a portion of the long PUSCH/PUCCH transmission can be dropped. This may correspond to OFDM/SC-FDMA symbols of the long PUSCH/PUCCH for which the reference signals with OCC are a phase reference.

In another example, if a UE has semi-statically configured short PUCCH/PUSCH, such as URLLC SR, resources and semi-statically configured long PUSCH/PUCCH, such as periodic CSI report, resources, if the short PUCCH/PUSCH and long PUSCH/PUCCH resources occur on non-contiguous PRBs in the same slot, and if the UE does not support an UL transmission on non-contiguous PRBs in the frequency domain, the UE may not use the semi-statically configured short PUCCH/PUSCH resources, but the UE can move short PUCCH/PUSCH transmissions within the long PUSCH/PUCCH resources. Furthermore, the UE can puncture the long PUSCH/PUCCH on the resource elements where short PUCCH(s)/PUSCH(s) are actually transmitted.

In one example, the UE can be configured with a semi-static resource corresponding to at least a portion of the short PUSCH/PUCCH to rate-match around for a long PUSCH/PUCCH resource assignment if the long PUSCH/PUCCH resource allocation overlaps at least partially with the semi-static configured resource. In this case, the semi-static resource can be as one or more resource blocks on one or more OFDM/SC-FDMA symbols, where the number of OFDM/SC-FDMA symbols can be preferably much smaller than the number of OFDM/SC-FDMA symbols in the long PUSCH/PUCCH. In one example, rate-matching around for a long PUSCH/PUCCH resource assignment can include rate-matching around the entire OFDM/SC-FDMA symbols associated to the semi-static resource.

According to another possible embodiment, a NE can include an indication on whether the UE has to monitor UE-specific or group-specific DCI carrying dynamic puncturing information, which can be denoted as "puncturing DCI," or not, such as via a 1-bit flag, in UL DCI scheduling long PUSCH/PUCCH. Alternatively, the UE can monitor puncturing DCI if the number of allocated PRBs for long PUSCH/PUCCH is larger than a certain value. In UL DCI for long PUSCH/PUCCH, the NE can further indicate a monitoring interval of puncturing DCI, such as a slot-level or mini-slot level interval.

Figure 6:
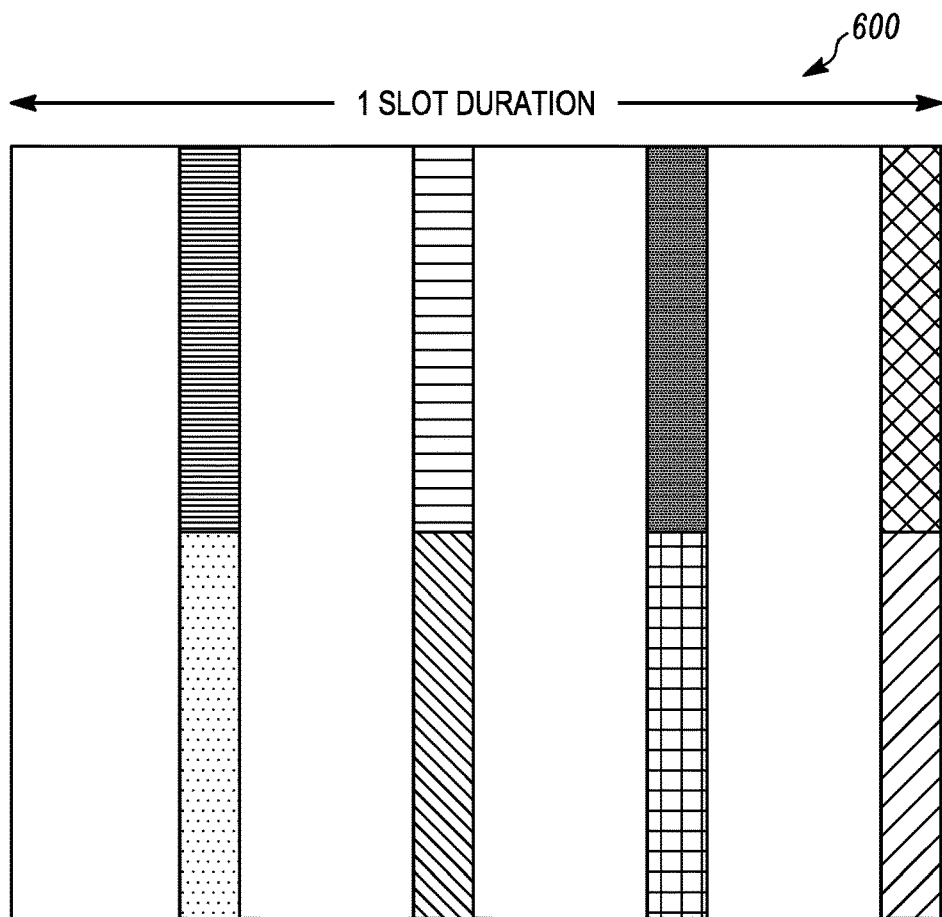
FIG. 6 is an example illustration of a puncturing pattern for mini-slot level monitoring of puncturing DCI within a slot-based PUSCH according to a possible embodiment.
Figure 7:
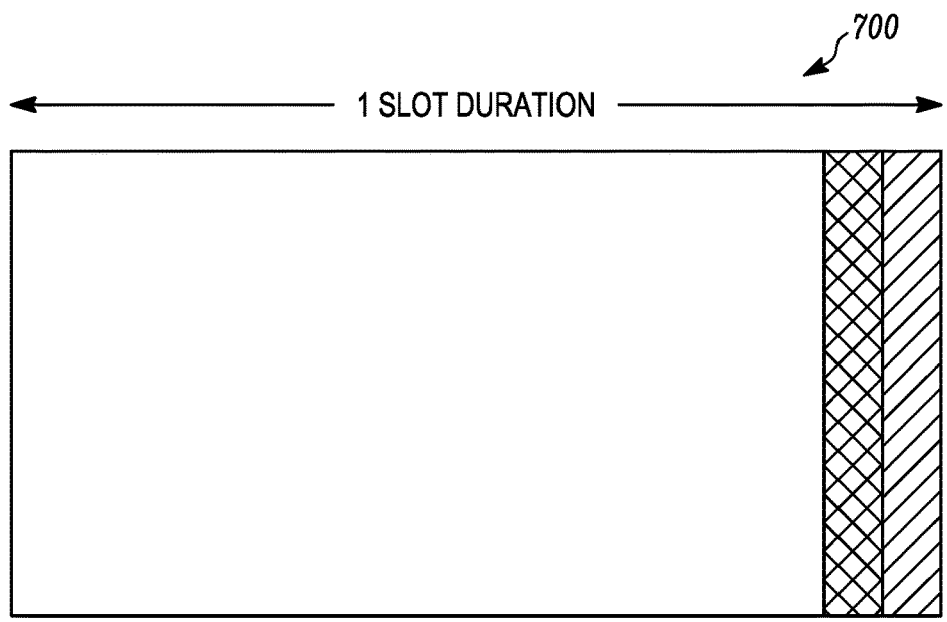
FIG. 7 is an example illustration of a puncturing pattern for slot level monitoring of puncturing DCI within a slot-based PUSCH according to a possible embodiment.

FIG. 6 is an example illustration 600 of a puncturing pattern for mini-slot or non-slot level monitoring of puncturing DCI within a slot-based PUSCH according to a possible embodiment. FIG. 7 is an example illustration 700 of a puncturing pattern for slot level monitoring of puncturing DCI within a slot-based PUSCH according to a possible embodiment. The UE's dynamic puncturing on the long PUSCH/PUCCH may be needed to multiplex dynamically scheduled short PUCCH/PUSCH for the same UE or for different UE(s). To minimize the demodulation performance degradation of the punctured long PUSCH/PUCCH, a NE may allocate short PUCCH/PUSCH resources overlapped with the long PUSCH/PUCCH resource only in the long PUSCH/PUCCH with large PRB allocation. In one embodiment, the UE and the NE can derive puncturing patterns and payload sizes for puncturing DCI based on the knowledge on the allocated number of PRBs and symbols for long PUSCH/PUCCH and the monitoring interval of the puncturing DCI. This can limit signaling overhead in the puncturing DCI and avoid increase of UE blind decoding complexity. In the example illustration 600, the UE can be signaled to monitor puncturing DCI in every other symbol, such as mini-slot level monitoring, and applicability of puncturing on 2 possible locations in each monitoring interval can be signaled with a 2-bit bitmap. In the illustration 700, the UE can be signaled to monitor puncturing DCI in every slot and applicability of puncturing on 2 possible locations can also be signaled with 2-bit bitmap.

Figure 8:
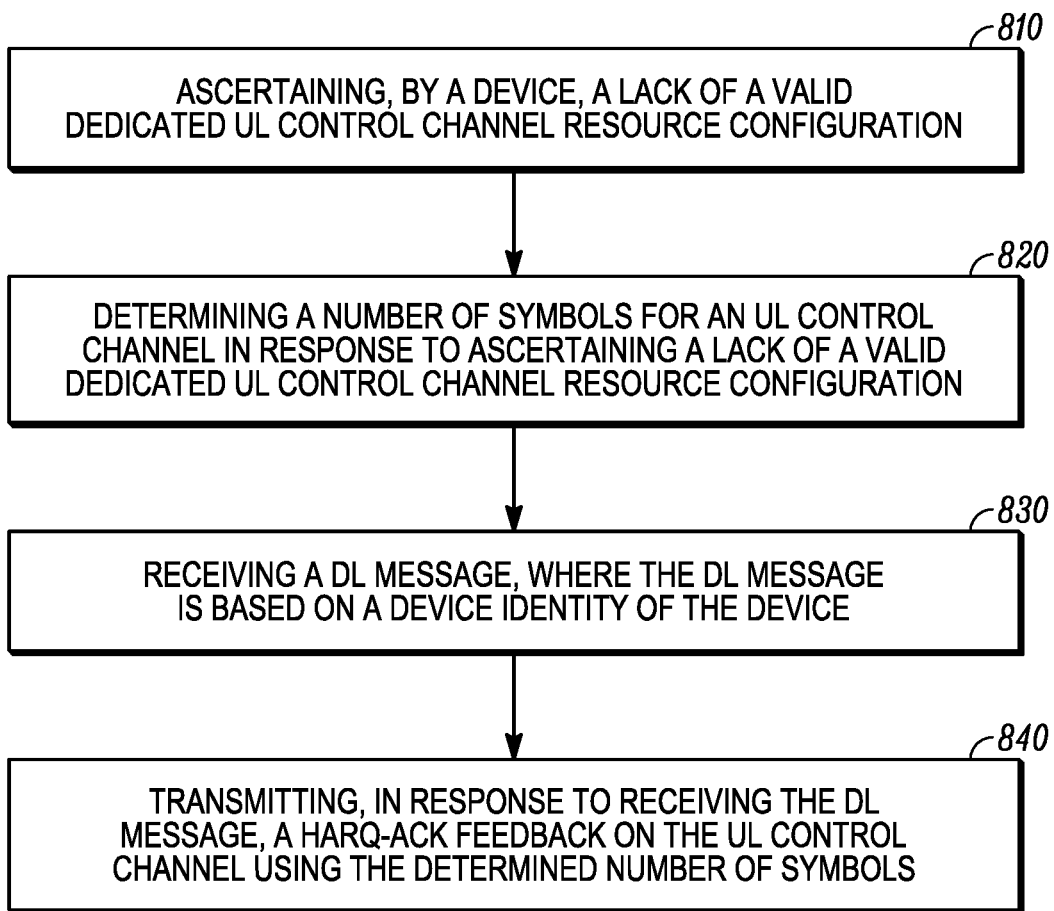
FIG. 8 is an example flowchart illustrating the operation of a wireless communication device according to a possible embodiment.

FIG. 8 is an example flowchart 800 illustrating the operation of a wireless communication device, such as the UE 110, according to a possible embodiment. At 810, a lack of a valid dedicated UL control channel resource configuration can be ascertained by the device. The device identity can be a UE identity. The UL control channel can be a PUCCH or any other UL channel that can carry control signaling, such as Channel Quality Indicators (CQIs), Acknowledgement/Negative Acknowledgements (ACK/NACKs), SRs, and other control signaling. There can be a lack of a valid dedicated UL control channel resource due to the device not having a dedicated UL control channel resource, due to the device having an expired dedicated UL control channel resource because of UL timer expiration, due to release/reset of previously configured dedicated UL control channel resources, or due to any other reason. According to a possible implementation, information of supported UL control channel formats can be transmitted. According to another possible implementation, two different types of UL channels, such as PUCCHs, in terms of transmission duration can be supported by the device. In different embodiments, the OFDM symbols can be OFDM symbols, DFT-s-OFDM symbols, and/or other symbols useful for a PUCCH. According to a possible implementation, a RACH preamble can be transmitted. A RAR message can be received in response to the transmitted RACH preamble. The RAR message can include information of an UL grant. The UL grant can be a PUSCH grant or any other uplink channel grant. An UL message can be transmitted according the UL grant. The UL message can be a Msg3 message or any other UL message. The UL message can carry at least a device identity of the device. The DL message can be received in response to transmitting the UL message.

At 820, a number of symbols for an UL control channel can be determined in response to ascertaining a lack of a valid dedicated UL control channel resource configuration. Determining can include determining the number of symbols based on a number of UL data channel transmissions for a same transport block and/or based on available UL symbols in a slot where the HARQ-ACK feedback to the DL message will be transmitted. The UL data channel can be a PUSCH or any other UL data channel.

According to a possible implementation, an indication of a number of symbols for the UL control channel can be received via system information. The indication can be an index to predefined set of UL control channel configurations. The index can identify a number of symbols in a predefined set of numbers of symbols in the predefined set of UL control channel configurations. The indicated number of symbols can be identified from the predefined set of numbers of symbols. The predetermined set of numbers of symbols can be based on a reference numerology indicated in the system information. For example, different numerologies provide for different subcarrier spacing in the frequency domain, where slot duration can get shorter as the subcarrier spacing gets wider. Determining can include determining the number of symbols based on the received indication.

At 830, a DL message can be received. The DL message can be based on a device identity of the device. The DL message can be a Msg4 message or any other message. At 840, a HARQ-ACK feedback on the UL control channel can be transmitted using the determined number of symbols in response to receiving the DL message. The index received in the indication above can also identify a cell-specific PRB offset for the UL control channel and the HARQ-ACK feedback can be transmitted on the UL control channel, in response to receiving the DL message, using the identified cell-specific PRB offset.

The index can additionally identify a starting symbol for the UL control channel and the HARQ-ACK feedback on the UL control channel can be transmitted using the identified starting symbol in response to receiving the DL message. For example, for PUCCH longer than two symbols, an allocated PRB index, where PRB indexing starts from a bandwidth part boundary, can be determined based on a dynamically signaled value together with a semi-statically indicated, such as via RAR or SIB, PRB offset. The DL message can be based on an identity of the device by including the device identity, by scrambling the message using the device identity, by being addressed by the device identity, or otherwise based on the device identity. Transmitting the HARQ-ACK feedback can include transmitting a HARQ-ACK feedback via a long PUCCH in response to receiving the DL message.

According to a possible implementation, DL scheduling DCI can be received. The DL scheduling DCI can include information of a device-specific PRB offset and cyclic shift information of a base sequence for the HARQ-ACK feedback transmission. The HARQ-ACK can use a particular cyclic shift and the HARQ-NACK can use a different cyclic shift. A base sequence for ACK/NACK transmission, such as the HARQ-ACK feedback, can be identified via cell-specific information, such as a cell-specific scrambling ID parameter, a 'hoppingID', and/or other cell-specific information. The cyclic shift information can further identify the device-specific cyclic shift of the base sequence that the device should use for its ACK/NACK transmission.

Figure 9:
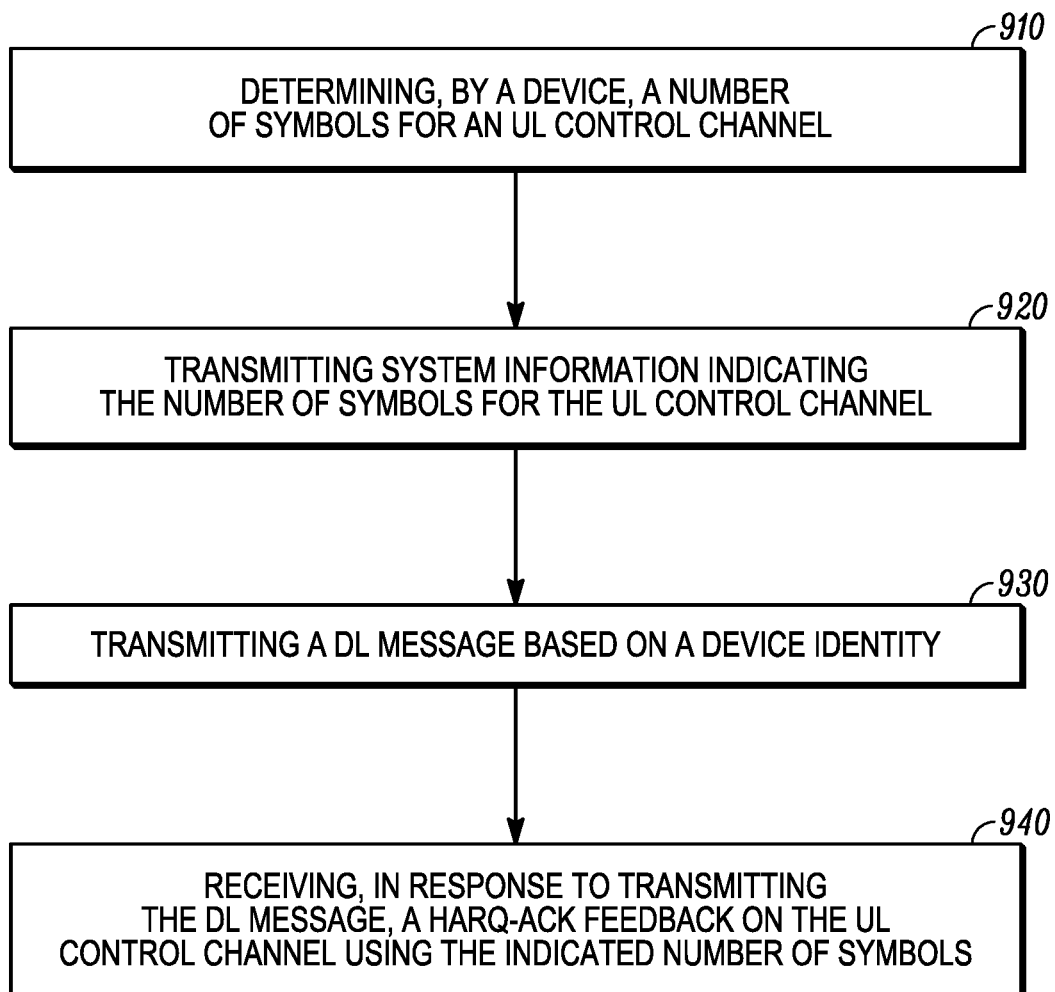
FIG. 9 is an example flowchart illustrating the operation of a wireless communication device according to a possible embodiment.

FIG. 9 is an example flowchart 900 illustrating the operation of a wireless communication device, such as the NE 120, according to a possible embodiment. At 910, a number of symbols for an UL control channel can be determined by a device, such as the NE 120. The number of symbols for the UL control channel can be determined based on cell size. The number of symbols for the UL control channel can also be determined based on number of configured symbols for a DL control resource. The number of symbols can additionally be determined based on a number of PUSCH transmissions for a same transport block and/or based on available UL symbols in a slot where the HARQ-ACK feedback to the DL message will be transmitted.

At 920, system information indicating the number of symbols for the UL control channel can be transmitted. An indication of a number of symbols for subsequent UL control channel transmissions can also be transmitted. The number of symbols for subsequent UL control channel transmissions can be based on a UE's PHR and/or an average number of UL transmissions for successful decoding of one UL TB. The indication can be an index to predefined set of UL control channel configurations. The index can also identify a number of symbols in a predefined set of numbers of symbols in the predefined set of UL control channel configurations. The predetermined set of numbers of symbols can be based on a reference numerology indicated in the system information.

At 930, a DL message based on a device identity can be transmitted. The device identity can be a UE ID or any other device identity. DL scheduling DCI can also be transmitted. The DL scheduling DCI can include information of a device-specific PRB offset and cyclic shift information of a base sequence for the HARQ-ACK feedback.

According to a possible implementation, a RACH preamble can be received. A RAR message can be transmitted in response to the received RACH preamble. The RAR message can include information of an UL grant. The UL grant can be a PUSCH grant. An UL message can be received according the UL grant. The UL message can carry at least a device identity of a device. The DL message can then be transmitted at 930 in response to receiving the UL message.

At 940, a HARQ-ACK feedback transmission can be received on the UL control channel using the indicated number of symbols in response to transmitting the DL message. According to a possible implementation, the index described above can also identify a cell-specific PRB offset for the UL control channel and the HARQ-ACK feedback can be received on the UL control channel using the identified cell-specific PRB offset in response to transmitting the DL message. The index can further identify a starting symbol for the UL control channel and the HARQ-ACK feedback can be received on the UL control channel using the identified starting symbol in response to transmitting the DL message.

Figure 10:
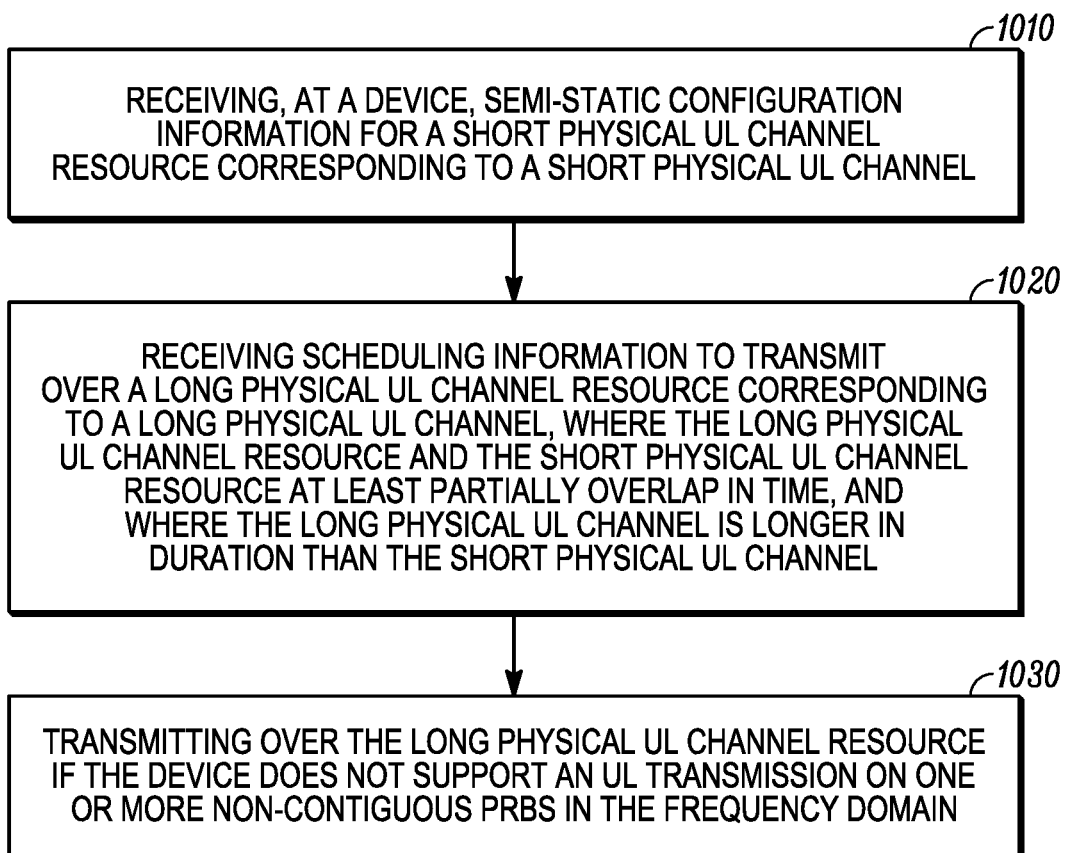
FIG. 10 is an example flowchart illustrating the operation of a wireless communication device according to a possible embodiment.

FIG. 10 is an example flowchart 1000 illustrating the operation of a wireless communication device, such as the UE 110, according to a possible embodiment. At 1010, semi-static configuration information for a short physical UL channel resource can be received at a device. The short physical UL channel resource can correspond to a short physical UL channel A physical uplink channel can be a PUCCH, a PUSCH, or any other physical uplink channel. The short physical UL channel resource can be shared by multiple devices. For example, the short physical UL channel resource can be shared by multiple UEs via Code Division Multiplexing (CDM).

At 1020, scheduling information to transmit over a long physical UL channel resource corresponding to a long physical UL channel can be received. The long physical UL channel resource and the short physical UL channel resource can at least partially overlap in time. The short physical UL channel resource can include contiguous physical resource blocks in frequency and contiguous OFDM or SC-FDMA symbols in time. The long physical UL channel resource can include contiguous physical resource blocks in frequency and contiguous OFDM or SC-FDMA symbols in time. The long physical UL channel can be longer in duration than the short physical UL channel.

According to a possible implementation the short physical UL channel resource can be determined to partially overlap the long physical UL channel in the frequency domain. The short physical UL channel resource can be modified to fully overlap with the long physical UL channel resource in the frequency domain based on determining the short physical UL channel resource partially overlaps the long physical UL channel in the frequency domain. The modification can ensure no change of power spectral density.

At 1030, transmission can be made over the long physical UL channel resource if the device does not support an UL transmission on one or more non-contiguous PRBs in the frequency domain. According to a possible implementation rate-matching of the long physical UL channel around the short physical UL channel resource can be performed if the long physical UL channel resource for the long physical UL channel at least partially includes the short physical UL channel resource in the frequency domain. Rate-matching of the long physical UL channel around the modified short physical UL channel resource can be performed if the long physical UL channel resource for the long physical UL channel at least partially includes the short physical UL channel resource in the frequency domain.

According to a possible implementation, a URLLC SR can be transmitted on the short physical UL channel resource. The URLLC SR can also be transmitted on the modified short physical UL channel resource.

According to another possible implementation, a grant-free UL data transmission can be performed on the short physical UL channel resource. The grant-free UL data transmission can also be performed on the modified short physical UL channel resource.

According to another possible implementation, a physical UL channel resource can be identified in the long physical UL channel resource to transmit the short physical UL channel if the long physical UL channel resource does not overlap the short physical UL channel resource in the frequency domain. The physical UL channel resource can be fully, such as completely, within the long physical UL channel resource.

According to another possible implementation, the short physical UL channel can be transmitted on the identified physical UL channel resource. The long physical UL channel can be punctured on the identified short physical UL channel resource. The long physical UL channel can be punctured on the identified short physical UL channel resource and additional resource elements. This can allow for power adjustment and setting settling time. Transmission of the long physical UL channel can be skipped after transmitting the short physical UL channel if transmit phase continuity cannot be maintained after transmitting the short physical UL channel. For example, the transmission of the long physical UL channel can be dropped after transmitting the short physical UL channel, if transmit phase continuity cannot be maintained after transmitting the short physical UL channel.

Figure 11:
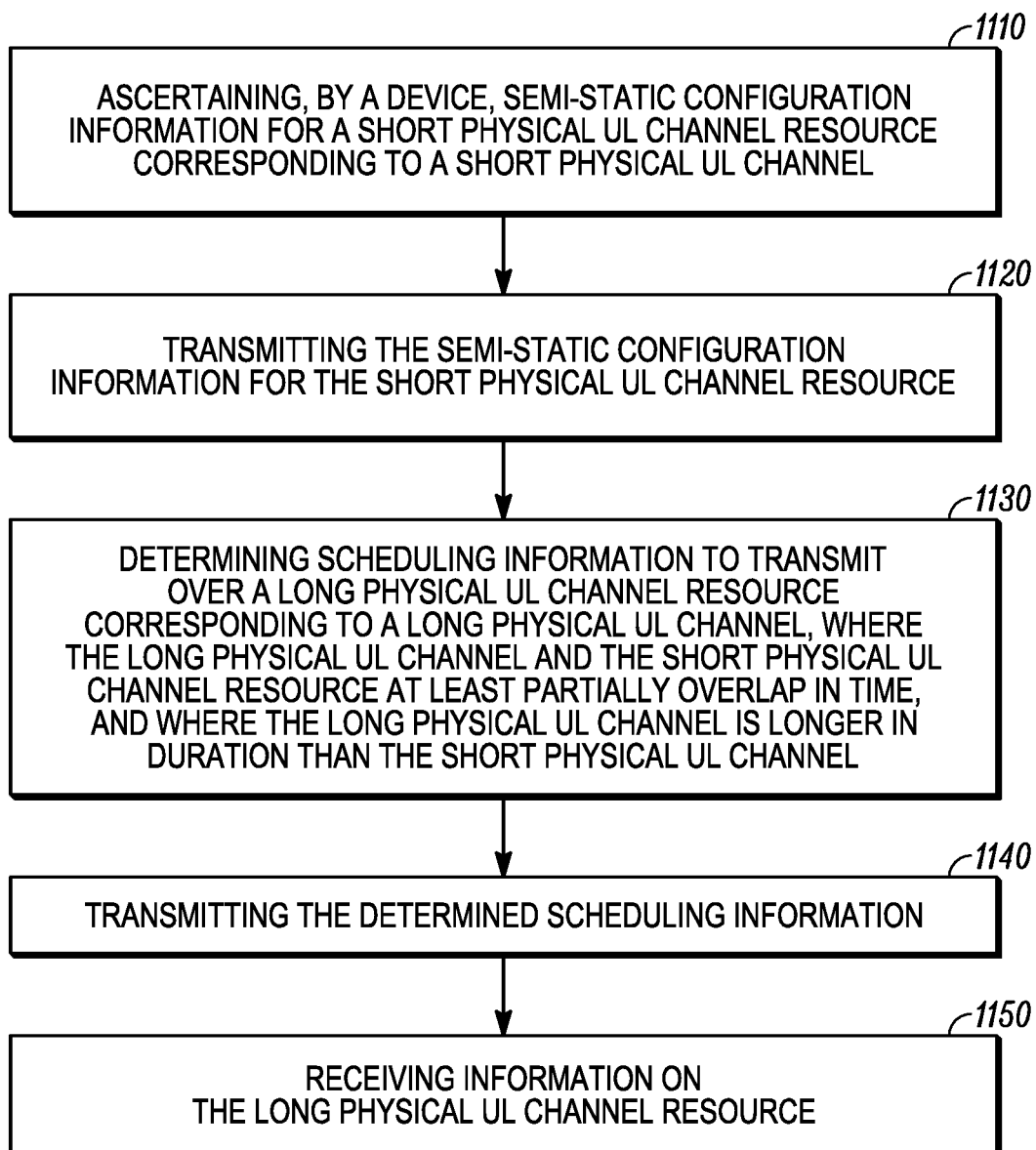
FIG. 11 is an example flowchart illustrating the operation of a wireless communication device according to a possible embodiment.

FIG. 11 is an example flowchart 1100 illustrating the operation of a wireless communication device, such as the NE 120, according to a possible embodiment. At 1110, semi-static configuration information can be ascertained for a short physical UL channel resource corresponding to a short physical UL channel A physical UL channel can be a PUCCH, a PUSCH, or any other physical UL channel. The short physical UL channel resource can be shared by multiple devices. At 1120, the semi-static configuration information for the short physical UL channel resource can be transmitted.

At 1130, scheduling information to transmit over a long physical UL channel resource corresponding to a long physical UL channel can be determined. The long physical UL channel and the short physical UL channel resource can at least partially overlap in time. The long physical UL channel can be longer in duration than the short physical UL channel. At 1140, the determined scheduling information can be transmitted.

At 1150, information can be received on the long physical UL channel resource. The long physical UL channel can be received rate-matched around the short physical UL channel resource if the long physical UL channel resource at least partially includes the short physical UL channel resource in the frequency domain. An URLLC SR can also be received on the short physical UL channel resource.

According to a possible implementation, a physical UL channel resource in the long physical UL channel resource can be identified to receive the short physical UL channel if the long physical UL channel resource does not overlap the short physical UL channel resource in the frequency domain. The physical UL channel resource can be fully, such as completely, within the long physical UL channel resource. The short physical UL channel can be received on the identified physical UL channel resource. Receiving the short physical UL channel can include detecting transmission of the short physical UL channel on the identified physical UL channel resource. The long physical UL channel can be received punctured on the identified short physical UL channel resource. The long physical UL channel can be received punctured on the identified short physical UL channel resource and additional resource elements. Transmission of the long physical UL channel after transmitting the short physical UL channel can be skipped if transmit phase continuity cannot be maintained after transmitting the short physical UL channel.

FIG. 12 is an example flowchart 1200 illustrating the operation of a wireless communication device, such as the UE 110, according to a possible embodiment. At 1210, scheduling information to transmit a physical UL channel can be received. The scheduling information can include modification information regarding modifying a physical UL channel transmission. For example, the scheduling information can include the modification information if a number of PRBs allocated for the physical UL channel is larger than a threshold number of PRBs. The scheduling information can also include information regarding at least one allocated PRB and at least one allocated symbol for the physical UL channel. The scheduling information can be in DCI. The DCI including scheduling information can be different from DCI including dynamic puncturing information. The modification information can include an indication of rate-matching of a physical UL channel around REs. The modification information can also include an identification of the REs around which to perform rate-matching. The modification information can be included in the scheduling information if a number of PRBs allocated for the physical UL channel is larger than a threshold number of PRBs. The modification information can additionally include information regarding monitoring for DCI including dynamic puncturing information. The modification information can further include information regarding monitoring a PDCCH for the DCI including dynamic puncturing information.

At 1220, the physical UL channel can be transmitted based on the scheduling information including the modification information. Transmitting can include performing rate-matching of the physical UL channel around REs based on the indication of rate matching. Transmitting can also include performing rate-matching of the physical UL channel around the REs around which to perform rate-matching. The REs around which to perform rate-matching can be determined based on a set of resources determined by a predefined configuration and/or a configurable parameter. For example, the predefined configuration can be a set of rate matching or puncturing resource grids and the configurable parameter can be a granularity of rate matching or puncturing resource grid.

According to a possible implementation, an indication of a monitoring interval for a PDCCH carrying the DCI including the dynamic puncturing information can be received. A puncturing pattern and a payload size of the DCI including the dynamic puncturing information can be determined. The puncturing pattern and the payload size can be determined based on the scheduling information for the physical UL channel and the monitoring interval. Monitoring occasions can be determined based on the indicated monitoring interval. The monitoring occasions can occur after receiving the scheduling information to transmit the physical UL channel and before completing transmission of the physical UL channel. The DCI including the dynamic puncturing information can be monitored for. Monitoring can include monitoring for a PDCCH carrying the DCI including dynamic puncturing information based on the determined monitoring occasions. The DCI including the dynamic puncturing information can be decoded. A resource for puncturing can be determined based on the dynamic puncturing information. The physical UL channel can be punctured on the determined resource for puncturing. Transmitting at 1220 can include transmitting the punctured physical UL channel.

FIG. 13 is an example flowchart 1300 illustrating the operation of a wireless communication device, such as the NE 120, according to a possible embodiment. At 1310, scheduling information to transmit a physical UL channel can be determined. The scheduling information can include modification information regarding modifying a physical UL channel transmission. The scheduling information can also include information regarding at least one allocated PRB and at least one allocated symbol for the physical UL channel. The modification information can include information regarding monitoring a PDCCH for DCI including dynamic puncturing information if a number of PRBs allocated for the physical UL channel is larger than a threshold number of PRBs. The modification information can be included in the scheduling information if a number of PRBs allocated for the physical UL channel is larger than a threshold number of PRBs.

According to a possible implementation, an indication of rate-matching of a physical UL channel around REs can be determined and the modification information can include the indication of rate-matching of a physical UL channel around REs. Also, REs around which to perform rate-matching can be identified and the modification information can include an identification of the REs around which to perform rate-matching. The REs around which to perform rate-matching can be determined based on a set of resources determined by a predefined configuration and/or a configurable parameter.

At 1320, the scheduling information including the modification information can be transmitted. At 1330, the physical UL channel can be received based on the scheduling information including the modification information.

According to a possible implementation, the modification information can include information regarding monitoring for DCI including dynamic puncturing information. The modification information can also include information regarding monitoring a PDCCH for the DCI including dynamic puncturing information. The DCI including dynamic puncturing information can be transmitted. An indication of a monitoring interval for a PDCCH carrying the DCI including the dynamic puncturing information can be transmitted. Monitoring occasions can be determined based on the indicated monitoring interval. The monitoring occasions can occur after transmitting the scheduling information to transmit the physical UL channel and before completing reception of the physical UL channel Transmitting the DCI can include transmitting a PDCCH carrying the DCI including dynamic puncturing information based on the indicated monitoring interval. A puncturing pattern and a payload size of the DCI including the dynamic puncturing information can be determined. The puncturing pattern and the payload size can be determined based on the scheduling information for the physical UL channel and the monitoring interval. The received physical UL channel can be punctured based on the dynamic puncturing information.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 14:
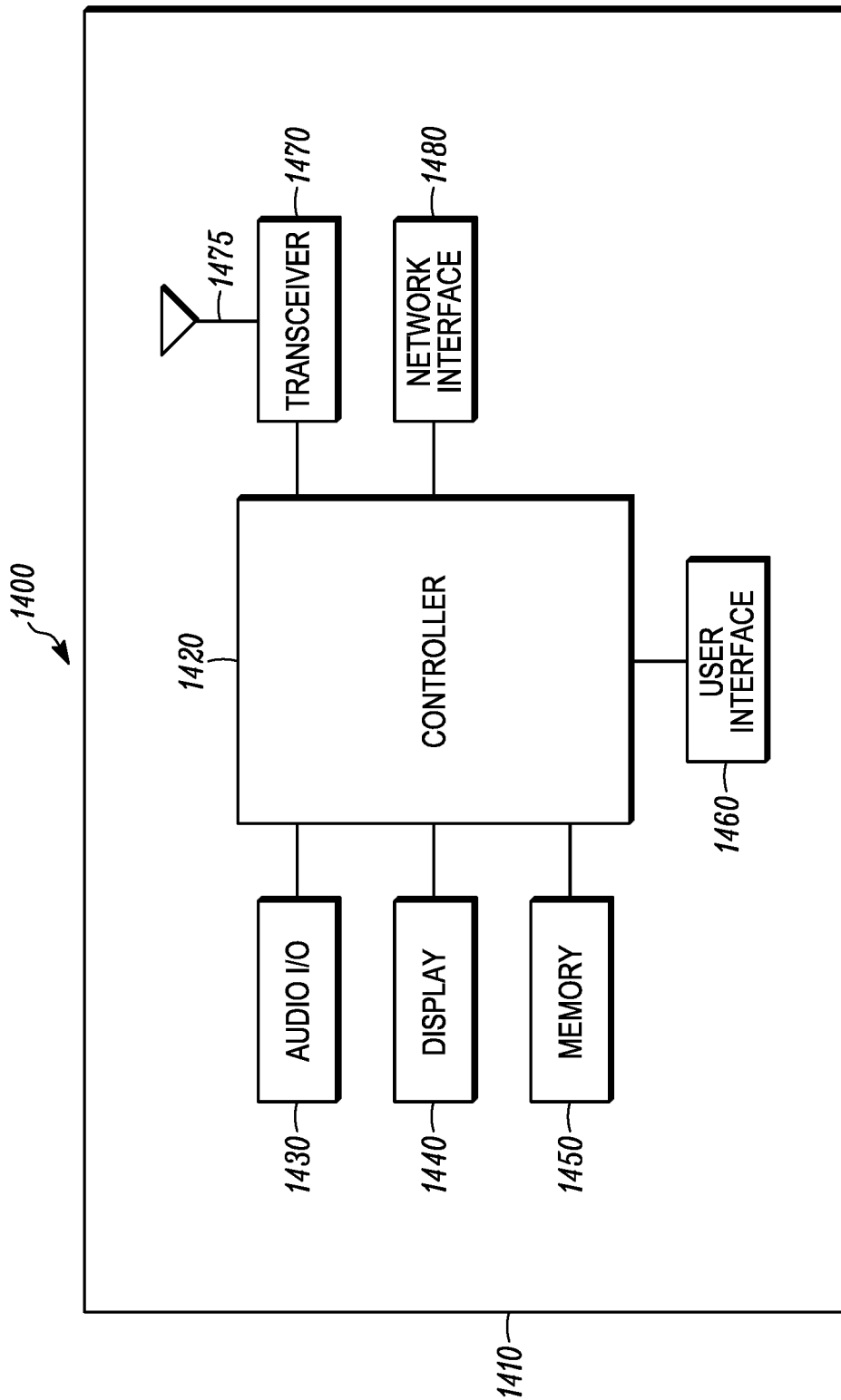
FIG. 14 is an example block diagram of an apparatus according to a possible embodiment.

FIG. 14 is an example block diagram of an apparatus 1400, such as the UE 110, the network entity 120, or any other wireless communication device disclosed herein, according to a possible embodiment. The apparatus 1400 can include a housing 1410, a controller 1420 coupled to the housing 1410, audio input and output circuitry 1430 coupled to the controller 1420, a display 1440 coupled to the controller 1420, a transceiver 1470 coupled to the controller 1420, at least one antenna 1475 coupled to the transceiver 1470, a user interface 1460 coupled to the controller 1420, a memory 1450 coupled to the controller 1420, and a network interface 1480 coupled to the controller 1420. The apparatus 1400 may not necessarily include all of the illustrated elements for different embodiments of the present disclosure. The apparatus 1400 can perform the methods described in all the embodiments.

The display 1440 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 1470 can be one or more transceivers that can include a transmitter and/or a receiver. The audio input and output circuitry 1430 can include a microphone, a speaker, a transducer, or any other audio input and output circuitry. The user interface 1460 can include a keypad, a keyboard, buttons, a touch pad, a joystick, a touch screen display, another additional display, or any other device useful for providing an interface between a user and an electronic device. The network interface 1480 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 1450 can include a Random Access Memory (RAM), a Read Only Memory (RON), an optical memory, a solid state memory, a flash memory, a removable memory, a hard drive, a cache, or any other memory that can be coupled to an apparatus.

The apparatus 1400 or the controller 1420 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1450 or elsewhere on the apparatus 1400. The apparatus 1400 or the controller 1420 may also use hardware to implement disclosed operations. For example, the controller 1420 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1420 may be any controller or processor device or devices capable of operating an apparatus and implementing the disclosed embodiments. Some or all of the additional elements of the apparatus 1400 can also perform some or all of the operations of the disclosed embodiments.

According to a possible embodiment in operation as a UE, the controller 1420 can ascertain a lack of a valid dedicated UL control channel resource configuration. The controller 1420 can determine a number of symbols for an UL control channel in response to ascertaining a lack of a valid dedicated UL control channel resource configuration. Determining can include determining the number of symbols based on a number of UL data channel transmissions for a same transport block and/or based on available UL symbols in a slot where the HARQ-ACK feedback to the DL message will be transmitted.

According to a possible implementation, the transceiver 1470 can receive, via system information, an indication of a number of symbols for the UL control channel and the controller 1420 can determine the number of symbols based on the received indication. The indication can be an index to predefined set of UL control channel configurations. According to a possible implementation, the index can identify a number of symbols in a predefined set of numbers of symbols in the predefined set of UL control channel configurations and the controller 1470 can identify the indicated number of symbols from the predefined set of numbers of symbols. The predetermined set of numbers of symbols can be based on a reference numerology indicated in the system information.

The transceiver 1470 can receive a DL message. The DL message can be based on a device identity of the device. The transceiver 1470 can also receive DL scheduling DCI, where the DL scheduling DCI includes information of a device-specific PRB offset and cyclic shift information of a base sequence for the HARQ-ACK feedback transmission.

The transceiver 1470 can transmit, in response to receiving the DL message, a HARQ-ACK feedback on the UL control channel using the determined number of symbols. According to a possible implementation, the index can further identify a cell-specific PRB offset for the UL control channel and the transceiver 1470 can transmit, in response to receiving the DL message, the HARQ-ACK feedback on the UL control channel using the identified cell-specific PRB offset. According to a possible implementation, the index can also identify a starting symbol for the UL control channel and the transceiver 1470 can transmit, in response to receiving the DL message, the HARQ-ACK feedback on the UL control channel using the identified starting symbol.

According to a possible embodiment in operation as a NE, the controller 1420 can determine a number of symbols for an UL control channel According to a possible implementation, the controller 1420 can determine the number of symbols based on a number of PUSCH transmissions for a same transport block and/or based on available UL symbols in a slot where the HARQ-ACK feedback to the DL message will be transmitted. The transceiver 1470 can transmit system information indicating the number of symbols for the UL control channel. The number of symbols for the UL control channel can be determined based on cell size. The number of symbols for the UL control channel can also be determined based on number of configured symbols for a DL control resource. The transceiver 1470 can transmit a DL message based on a device identity, such as an identity of the device the DL message is being transmitted to. The transceiver 1470 can transmit DL scheduling DCI. The DL scheduling DCI can include information of a device-specific PRB offset and cyclic shift information of a base sequence for HARQ-ACK feedback transmission. The transceiver 1470 can receive, in response to transmitting the DL message, a HARQ-ACK feedback on the UL control channel using the indicated number of symbols.

According to a possible implementation, the transceiver 1470 can receive a RACH preamble. The transceiver 1470 can transmit a RAR message in response to the received RACH preamble. The RAR message can include information of an UL grant. The transceiver 1470 can receive an UL message according the UL grant. The UL message can carry at least a device identity of a device that sent the UL message.

According to another possible implementation, the transceiver 1470 can transmit an indication of a number of symbols for subsequent UL control channel transmissions. The number of symbols for subsequent UL control channel transmissions can be based on a UE's PHR and/or an average number of UL transmissions for successful decoding of one UL TB.

According to a possible embodiment in operation as a UE, the controller 1420 can control operations of the apparatus 1400. The transceiver 1470 can receive semi-static configuration information for a short physical UL channel resource corresponding to a short physical UL channel. The short physical UL channel resource can be shared by multiple devices, such as multiple UEs.

The transceiver 1470 can receive scheduling information to transmit over a long physical UL channel resource corresponding to a long physical UL channel. The long physical UL channel resource and the short physical UL channel resource can at least partially overlap in time. The long physical UL channel can be longer in duration than the short physical UL channel.

The transceiver 1470 can transmit over the long physical UL channel resource if the device does not support an UL transmission on one or more non-contiguous PRBs in the frequency domain. The controller 1420 can perform rate-matching of the long physical UL channel around the short physical UL channel resource for transmission of the long physical UL channel if the long physical UL channel resource for the long physical UL channel at least partially includes the short physical UL channel resource in the frequency domain. The transceiver 1470 can also transmit a URLLC SR on the short physical UL channel resource. The transceiver 1470 can further perform a grant-free UL data transmission on the short physical UL channel resource.

According to a possible implementation, the controller 1420 can determine that the short physical UL channel resource partially overlaps the long physical UL channel in the frequency domain. The controller 1420 can modify the short physical UL channel resource to fully overlap with the long physical UL channel resource in the frequency domain based on determining the short physical UL channel resource partially overlaps the long physical UL channel in the frequency domain. The controller 1420 can perform rate-matching of the long physical UL channel around the modified short physical UL channel resource if the long physical UL channel resource for the long physical UL channel at least partially includes the short physical UL channel resource in the frequency domain.

According to another possible implementation, the controller 1420 can identify a physical UL channel resource in the long physical UL channel resource to transmit the short physical UL channel if the long physical UL channel resource does not overlap the short physical UL channel resource in the frequency domain. The transceiver 1470 can transmit the short physical UL channel on the identified physical UL channel resource. The controller 1420 can puncture the long physical UL channel on the identified short physical UL channel resource.

According to a possible embodiment in operation as a NE, the controller 1420 can ascertain semi-static configuration information for a short physical UL channel resource corresponding to a short physical UL channel. The short physical UL channel resource can be shared by multiple devices. The transceiver 1470 can transmit the semi-static configuration information for the short physical UL channel resource. The controller 1420 can determine scheduling information to transmit over a long physical UL channel resource corresponding to a long physical UL channel. The long physical UL channel and the short physical UL channel resource can at least partially overlap in time. The long physical UL channel can be longer in duration than the short physical UL channel. The transceiver 1470 can transmit the determined scheduling information. The transceiver 1470 can receive information on the long physical UL channel resource. The transceiver 1470 can receive the long physical UL channel rate-matched around the short physical UL channel resource if the long physical UL channel resource at least partially includes the short physical UL channel resource in the frequency domain. The transceiver 1470 can also receiver an URLLC SR on the short physical UL channel resource.

According to a possible implementation, the controller 1420 can identify a physical UL channel resource in the long physical UL channel resource to receive the short physical UL channel if the long physical UL channel resource does not overlap the short physical UL channel resource in the frequency domain. The transceiver 1470 can receive the short physical UL channel on the identified physical UL channel resource. Receiving the short physical UL channel can include detecting transmission of the short physical UL channel on the identified physical UL channel resource. The transceiver 1470 can receive the long physical UL channel punctured on the identified short physical UL channel resource. The transceiver 1470 can receive the long physical UL channel punctured on the identified short physical UL channel resource and additional resource elements. Transmission of the long physical UL channel after transmitting the short physical UL channel can be skipped if transmit phase continuity cannot be maintained after transmitting the short physical UL channel.

According to a possible embodiment in operation as a UE, the controller 1420 can control operations of the apparatus 1400. The transceiver 1470 can receive scheduling information to transmit a physical UL channel. The scheduling information can include modification information regarding modifying a physical UL channel transmission. The scheduling information can also include information regarding at least one allocated PRB and at least one allocated symbol for the physical UL channel. The modification information can include an indication of rate-matching of a physical UL channel around REs. The modification information can also include an identification of the REs around which to perform rate-matching. The modification information can be included in the scheduling information if a number of PRBs allocated for the physical UL channel is larger than a threshold number of PRBs. The controller 1420 can determine the REs around which to perform rate-matching based on a set of resources determined by a predefined configuration and/or a configurable parameter.

The transceiver 1470 can transmit the physical UL channel based on the scheduling information including the modification information. Transmitting can include performing rate-matching of the physical UL channel around REs based on the indication of rate matching. Transmitting can also include performing rate-matching of the physical UL channel around the REs around which to perform rate-matching.

According to a possible implementation, the modification information can include information regarding monitoring for DCI including dynamic puncturing information. The modification information can also include information regarding monitoring a PDCCH for the DCI including dynamic puncturing information. The transceiver 1470 can receive an indication of a monitoring interval for a PDCCH carrying the DCI including the dynamic puncturing information. The controller 1420 can determine monitoring occasions based on the indicated monitoring interval. The controller 1420 can monitor for the DCI including the dynamic puncturing information. Monitoring for the DCI can include monitoring for a PDCCH carrying the DCI including dynamic puncturing information based on the determined monitoring occasions. The monitoring occasions can occur after receiving the scheduling information to transmit the physical uplink channel and before completing transmission of the physical uplink channel. The controller 1420 can decode the DCI including the dynamic puncturing information. The controller 1420 can determine a resource for puncturing based on the dynamic puncturing information. The controller 1420 can determine a puncturing pattern and a payload size of the DCI including the dynamic puncturing information based on the scheduling information for the physical uplink channel and the monitoring interval. The controller 1420 can puncture the physical UL channel on the determined resource for puncturing. The transceiver 1470 can transmit the physical UL channel by transmitting the punctured physical UL channel.

According to a possible embodiment in operation as a NE, the controller 1420 can determine scheduling information to transmit a physical UL channel. The scheduling information including modification information can regard modifying a physical UL channel transmission. The scheduling information can also include information regarding at least one allocated PRB and at least one allocated symbol for the physical UL channel. The modification information can include information regarding monitoring a PDCCH for DCI including dynamic puncturing information if a number of PRBs allocated for the physical UL channel is larger than a threshold number of PRBs. The controller 1420 can also determine an indication of rate-matching of a physical UL channel around REs and the modification information can include the indication of rate-matching of a physical UL channel around REs. The controller 1420 can also identify REs around which to perform rate-matching and the modification information can include an identification of the REs around which to perform rate-matching. The controller 1420 can determine the REs around which to perform rate-matching based on a set of resources determined by at least one selected from a predefined configuration and a configurable parameter. The modification information can also include information regarding monitoring for DCI including dynamic puncturing information. The modification information can be included in the scheduling information if a number of PRBs allocated for the physical UL channel is larger than a threshold number of PRBs. The DCI including the dynamic puncturing information can be transmitted after transmitting the scheduling information for the physical uplink channel and before completing reception of the physical uplink channel. A puncturing pattern and a payload size of the DCI including the dynamic puncturing information can be based on the scheduling information for the physical uplink channel and a monitoring interval for the DCI including the dynamic puncturing information.

The transceiver 1470 can transmit the scheduling information including the modification information. The transceiver 1470 can also transmit the DCI including dynamic puncturing information. The transceiver 1470 can receive the physical UL channel based on the scheduling information including the modification information. The received physical UL channel can be punctured based on the dynamic puncturing information.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
   receiving, at a device, a semi-static configuration information for a short physical uplink channel resource corresponding to a short physical uplink channel;
   receiving scheduling information to transmit over a long physical uplink channel resource corresponding to a long physical uplink channel, where the long physical uplink channel resource and the short physical uplink channel resource at least partially overlap in time, and where the long physical uplink channel is longer in duration than the short physical uplink channel;
   performing rate-matching of the long physical uplink channel around the short physical uplink channel resource if the long physical uplink channel resource at least partially includes the short physical uplink channel resource in the frequency domain, where the rate-matching is performed irrespective of whether there is data for transmission on the short physical uplink channel resource; and
   transmitting the rate-matched long physical uplink channel when there is no transmission of the short physical uplink channel from the device.

2. The method according to claim 1, further comprising:
   determining that the short physical uplink channel resource partially overlaps the long physical uplink channel in the frequency domain and there is a transmission of the short physical uplink channel from the device;
   modifying the short physical uplink channel resource to fully overlap with the long physical uplink channel resource in the frequency domain based on determining the short physical uplink channel resource partially overlaps the long physical uplink channel in the frequency domain and there is the transmission of the short physical uplink channel from the device; and
   transmitting the short physical uplink channel on the modified short physical uplink channel resource.

3. The method according to claim 2, further comprising performing rate-matching of the long physical uplink channel around the modified short physical uplink channel resource if the long physical uplink channel resource for the long physical uplink channel at least partially includes the short physical uplink channel resource in the frequency domain.

4. The method according to claim 1, wherein the short physical uplink channel resource is shared by multiple devices.

5. The method according to claim 1, wherein the short physical uplink channel is a physical uplink control channel configured for an ultra-reliable low-latency communication scheduling request, and the method further comprises transmitting the ultra-reliable low-latency communication scheduling request on the short physical uplink channel resource.

6. The method according to claim 1, wherein the short physical uplink channel is a grant-free physical uplink shared channel, and the method further comprises performing the grant-free uplink data transmission on the short physical uplink channel resource.

7. The method according to claim 1, further comprising identifying a physical uplink channel resource in the long physical uplink channel resource to transmit the short physical uplink channel if the long physical uplink channel resource does not overlap the short physical uplink channel resource in the frequency domain and there is a transmission of the short physical uplink channel from the device.

8. The method according to claim 7, further comprising:
transmitting the short physical uplink channel on the identified physical uplink channel resource; and
puncturing the long physical uplink channel on the identified short physical uplink channel resource.

9. The method according to claim 8, further comprising puncturing the long physical uplink channel on the identified short physical uplink channel resource and additional resource elements.

10. The method according to claim 9, further comprising skipping transmission of the long physical uplink channel after transmitting the short physical uplink channel, if transmit phase continuity cannot be maintained after transmitting the short physical uplink channel.

11. An apparatus comprising:
a controller configured to control operations of the apparatus; and
a transceiver coupled to the controller, where the transceiver
receives semi-static configuration information for a short physical uplink channel resource corresponding to a short physical uplink channel,
receives scheduling information to transmit over a long physical uplink channel resource corresponding to a long physical uplink channel, where the long physical uplink channel resource and the short physical uplink channel resource at least partially overlap in time, and where the long physical uplink channel is longer in duration than the short physical uplink channel,
performs rate-matching of the long physical uplink channel around the short physical uplink channel resource if the long physical uplink channel resource at least partially includes the short physical uplink channel resource in the frequency domain, where the rate-matching is performed irrespective of whether there is data for transmission on the short physical uplink channel resource, and
transmits the rate-matched long physical uplink channel when there is no transmission of the short physical uplink channel from the device.

12. The apparatus according to claim 11, wherein the controller
determines that the short physical uplink channel resource partially overlaps the long physical uplink channel in the frequency domain and there is a transmission of the short physical uplink channel from the apparatus,
modifies the short physical uplink channel resource to fully overlap with the long physical uplink channel resource in the frequency domain based on determining the short physical uplink channel resource partially overlaps the long physical uplink channel in the frequency domain and there is the transmission of the short physical uplink channel from the device, and
transmits the short physical uplink channel on the modified short physical uplink channel resource.

13. The apparatus according to claim 12, wherein the controller performs rate-matching of the long physical uplink channel around the modified short physical uplink channel resource if the long physical uplink channel resource for the long physical uplink channel at least partially includes the short physical uplink channel resource in the frequency domain.

14. The apparatus according to claim 11, wherein the short physical uplink channel resource is shared by multiple devices.

15. The apparatus according to claim 11,
wherein the short physical uplink channel is a physical uplink control channel configured for an ultra-reliable low-latency communication scheduling request, and
wherein the transceiver transmits the ultra-reliable low-latency communication scheduling request on the short physical uplink channel resource.

16. The apparatus according to claim 11,
wherein the short physical uplink channel is a grant-free physical uplink shared channel, and
wherein the transceiver performs a grant-free uplink data transmission on the short physical uplink channel resource.

17. The apparatus according to claim 11, wherein the controller identifies a physical uplink channel resource in the long physical uplink channel resource to transmit the short physical uplink channel if the long physical uplink channel resource does not overlap the short physical uplink channel resource in the frequency domain and there is a transmission of the short physical uplink channel from the apparatus.

18. The apparatus according to claim 17,
wherein the transceiver transmits the short physical uplink channel on the identified physical uplink channel resource, and
wherein the controller punctures the long physical uplink channel on the identified short physical uplink channel resource.

* * * * *